(12) United States Patent
Tan et al.

(10) Patent No.: US 12,463,454 B1
(45) Date of Patent: Nov. 4, 2025

(54) PARALLEL MULTI-SOURCE POWER SUPPLY SYSTEM WITH A UNIFIED OUTPUT

(71) Applicant: PHIHONG TECHNOLOGY CO., LTD., Taoyuan (TW)

(72) Inventors: Yan-Keng Tan, Taoyuan (TW); Chen-Chan Lin, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 18/795,990

(22) Filed: Aug. 6, 2024

(51) Int. Cl.
- *H02J 9/06* (2006.01)
- *H02J 3/38* (2006.01)
- *H02J 7/00* (2006.01)

(52) U.S. Cl.
CPC ............... *H02J 9/061* (2013.01); *H02J 3/38* (2013.01); *H02J 7/00034* (2020.01); *H02J 2207/20* (2020.01); *H02J 2207/30* (2020.01)

(58) Field of Classification Search
CPC .......... H02J 9/061; H02J 7/00034; H02J 3/38; H02J 2207/20; H02J 2207/30
See application file for complete search history.

(56) References Cited

U.S. PATENT DOCUMENTS 11,422,600 B2 * 8/2022 Sultenfuss ............ H02J 7/0063

* cited by examiner

*Primary Examiner* — Carlos Amaya
(74) *Attorney, Agent, or Firm* — Muncy, Geissler, Olds & Lowe, P.C.

(57) ABSTRACT

The present invention proposes a parallel multi-source power supply system with unified output, which includes the first power supply having the first and the second USB-C connectors, the second power supply having the third USB-C connector electrically connected to the first power supply in parallel through the second USB-C connector. The first power supply is configured to operate in a constant current and constant voltage (CCCV) mode to output the first power, while the second power supply is configured to operate in a constant voltage (CV) mode to output the second power. The second power is transferred to the first power supply and unified with the first power to power an external electronic system through the unified output. The amount of the second power transferred to the first power supply is determined by a charging agreement through communicating between the first power supply and the external electronic system.

17 Claims, 4 Drawing Sheets

PARALLEL MULTI-SOURCE POWER SUPPLY SYSTEM WITH A UNIFIED OUTPUT

TECHNICAL FIELD

The present invention relates to a parallel power supply system, and more particularly, a parallel multi-source power supply system with a unified output.

BACKGROUND

A power supply is an electrical device that supplies electric power to an electrical load. Indeed, power supplies typically have a power input connection, which receives energy in the form of electric current from a source, and one or more power output connections that deliver current to the load.

The primary function of a power supply is to provide power at the required voltage level to a system. Indeed, a power supply may perform a variety of functions, such as, but not limited to, power conversion, alternating current to direct current (AC-DC) or DC-DC conversion, adjusting voltage levels, and providing backup power during power grid outages. A power supply system typically includes multiple power sources (or power supplies) that provide power and power management functionality including load current sharing among the multiple power sources.

Unfortunately, conventional power supply systems suffer numerous deficiencies with respect to current sharing. For example, when multiple power supplies are connected in parallel to share the supply of a load current, and the load current dynamically changes in relatively rapid way, mismatches of various parameters between power supplies may cause a poor current sharing response to these changes.

With the development of science and technology, more and more electronic equipment and industrial control devices that utilized in various industries require larger-capacity DC power supplies for supplying electric power. Since the power of a single power supply is limited after all, and when using a single power supply for power supply, the heat dissipation problem is also difficult to solve.

When multiple power supplies are used for parallel output, since the performance of each power supply cannot be exactly the same, current sharing technology needs to be used to balance the output of each power supply when using multiple power supplies. If no measures are taken, the current output by each power supply will be different. At a certain load current, some power modules may operate in an overload state, while other modules may operate in an no-load state.

Various electronic devices, for example smartphones, tablets, notebook computers, laptop computers, hubs, chargers, adapters, etc. are configured to transfer power through Universal Serial Bus (USB) connectors according to USB power delivery protocols defined in various revisions of the USB Power Delivery (USB-PD) specification. For example, in some applications an electronic device may be configured to as a power consumer to receive power through a USB connector, while in other applications an electronic device may be configured as a power provider to provide power to another device that is connected thereto through a USB connector. The USB-PD specification, however, allows power provider and power consumers to dynamically negotiate the levels of the provided voltages and currents.

The USB power delivery technology has helped to charge the electronic devices very fast due to increased power capacity required by the USB PD standards. For example, utilizing parallel multi-source power supply system with USB PD output are commonly adopted to power electronic devices, such as computer system.

There is a need for improving the design and operation of the parallel USB PD multi-source power supply system.

SUMMARY OF THE INVENTION

In order to improve the above deficiencies, according to one aspect of the present invention, a parallel multi-source power supply system with a unified output is disclosed, which includes the first power supply having the first and the second USB-C connectors, a second power supply having the third USB-C connector electrically connected to the first power supply in parallel through the second USB-C connector. The first power supply is configured to operate in a constant current and constant voltage (CCCV) mode to output the first power, while the second power supply is configured to operate in a constant voltage (CV) mode to output the second power. The second power is transferred to the first power supply and unified with the first power to power an external electronic system through the unified output. The amount of the second power transferred to the first power supply is determined by a charging agreement through communicating between the first power supply and the external electronic system.

In one preferred embodiment, the first power supply includes a first AC to DC converter, the first switching device disposed between the first AC to DC converter and the first USB-C connector, and the first USB-C PD controller is configured to control the first switching device to provide the first power to the external electronic system. The first power supply further includes the second switching device disposed between the first USB-C connector and the second USB-C connector, and the second USB-C PD controller communicatively coupled to the first USB-C PD controller and the second switching device. The second power supply includes the second AC to DC converter, the third switching device disposed between the second AC to DC converter and the third USB-C connector, and the third USB-C PD controller is configured to control the third switching device to provide the second power to the first power supply.

In one preferred embodiment, the charging agreement is confirmed through a communication between the first USB-C PD controller and the fourth USB-C connector by sending a vender defined message built in the first USB-C PD controller.

In one preferred embodiment, the second power is transferred through a path starting from the second AC to DC converter, the third switching device, the third USB-C connector, the second USB-C controller, the second switching device, the first USB-C connector and the fourth USB-C connector to the external electronic system.

In one preferred embodiment, the parallel multi-source power supply system further includes an AC input power electrically to provide a system power to both the first power supply and the second power supply.

According to another aspect of the present invention, a method of power delivering for a parallel multi-source power supply system is disclosed, which includes connecting the first power supply and the second power supply in parallel, and coupling an external electronic system to the first power supply. The first power supply includes the first USB-C PD controller and the second USB-C PD controller. The second power supply includes the third USB-C PD controller. The method further includes communicating between the first power supply and the external electronic system by the first USB-C PD controller through a USB PD protocol to establish a charging agreement between them, providing available voltage and current of the second power supply by the second USB-C PD controller of the first power supply to learn through the USB PD protocol and notify the third USB-C PD controller of the second power supply, when the second power supply is connected, for setting charging specification to the external electronic system, outputting the first power from the second power supply to the first power supply with a constant voltage (CV) mode, notifying that the second power supply is connected to the first power supply through sending a notice from the second controller to the first controller, outputting the second power from the first power supply to the external electronic system with a constant current and constant voltage (CCCV) mode, and updating an information of available voltage and current of the parallel multi-source power supply system by the first controller to charge the external electronic system.

In one preferred embodiment, the charging agreement is confirmed through a communication between the first USB-C PD controller and a USB-C connector of the external electronic system by sending a vender defined message built in the first USB-C PD controller. The first USB-C PD controller and the USB-C connector of the external electronic system is communicated with each other through a configuration channel (CC).

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Over the past few years, the adoption trend and speed of USB Type-C ports have been seen. This is particularly true since the release of the USB PD (Power Delivery) 3.1 protocol, which raised the fast-charging power limit from 100 watts to 240 watts (supporting Extended Power Range, or EPR). This change has enabled the USB type-C to provide sufficient charging power for more devices, including large electronic devices that require higher-power charging, such as IoT devices, communication and security devices, automotive and medical devices, and more.

In the USB PD 3.1 protocol, the EPR mode contains three fixed voltage levels of 28 volts, 36 volts, and 48 volts, as well as three adjustable voltage supply (AVS). The voltages of 28 volts, 36 volts, and 48 volts in the USB PD 3.1 protocol correspond to applications using 6-, 8-, and 10-cell batteries, respectively. This allows USB PD's to be well-suited for devices such as computers, servers, motor drives, docking stations, displays IoTs, and communication power supplies. Further, the USB PD 3.1 protocol can support up to 240 W/48V power output and therefore extends the USB PD usage in fast charging applications.

The present invention proposes a novel technology for the parallel USB power delivery (PD) multi-source power supply with unified output, which is aimed for improving the design and operation of the parallel USB PD multi-source power supply system. This technology uses the USB PD communication protocol, for example the USB PD 3.1 protocol, to perform special settings on two power supplies having USB PD interface that are connected in parallel.

Figure 1:
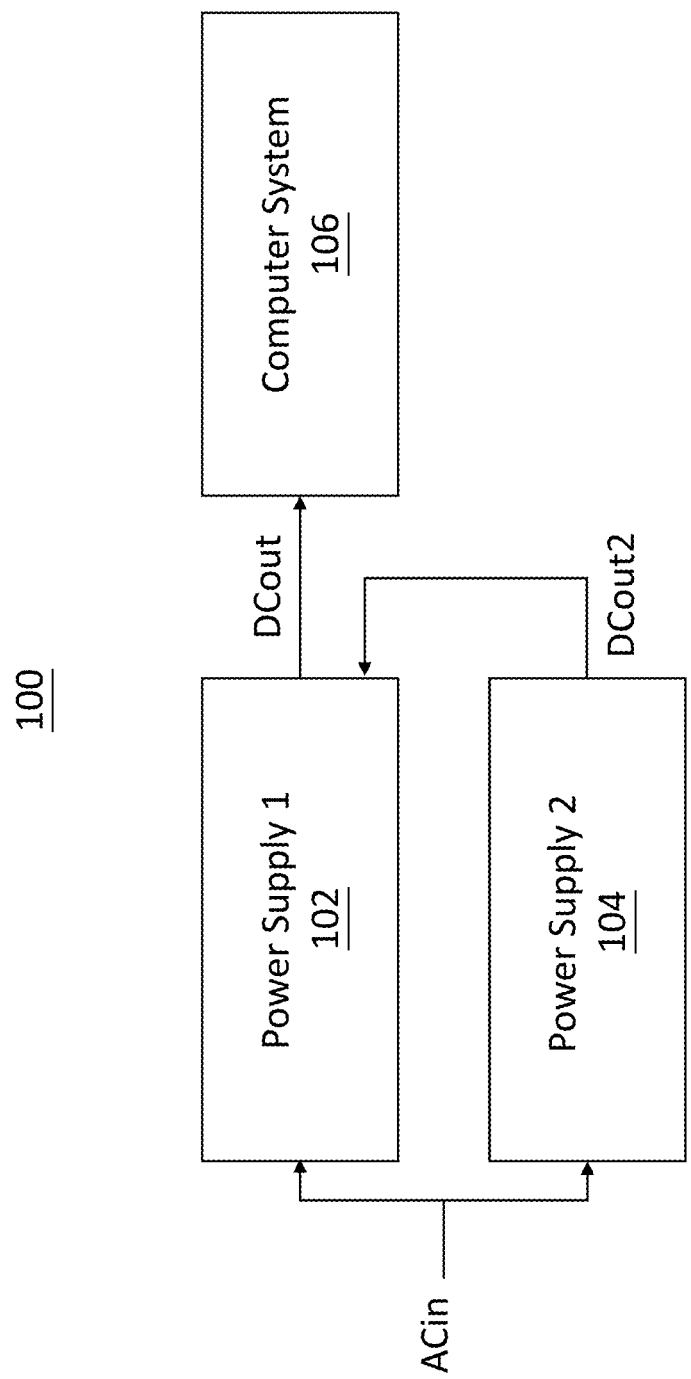
FIG. 1 shows an exemplary paralleled power supply system according to an embodiment of the present invention.

FIG. 1 illustrates an exemplary paralleled power supply system 100, including two power supplies, i.e. the first power supply 102 and the second power supply 104, connected in parallel, to output a DC power (DCout) to an external coupled electronic system, such as a computer system 106.

As shown in FIG. 1, these special settings include letting the first power supply 102 to operate in a constant voltage and constant current output mode (i.e. CCCV mode), while the second supply 104 operates in a constant voltage (CV) output mode. Through this method, the energy of the second power supply 104, i.e. DC output power (DCout2) of the second power supply, is effectively transferred to the first power supply 102, and then specify the united power (DCout) provided by the first power supply 102 to the computer system 106. The amount of the energy transferred to the first power supply 102 is determined by a charging agreement through communicating between the first second power 102 supply and the external electronic system (computer system 106). This charging agreement is confirmed between the first power supply 102 and the external electronic system 106 through sending a vender defined message (VDM) built in first USB-C PD controller (refer to FIG. 2) 114 of the first power supply 102.

Figure 2:
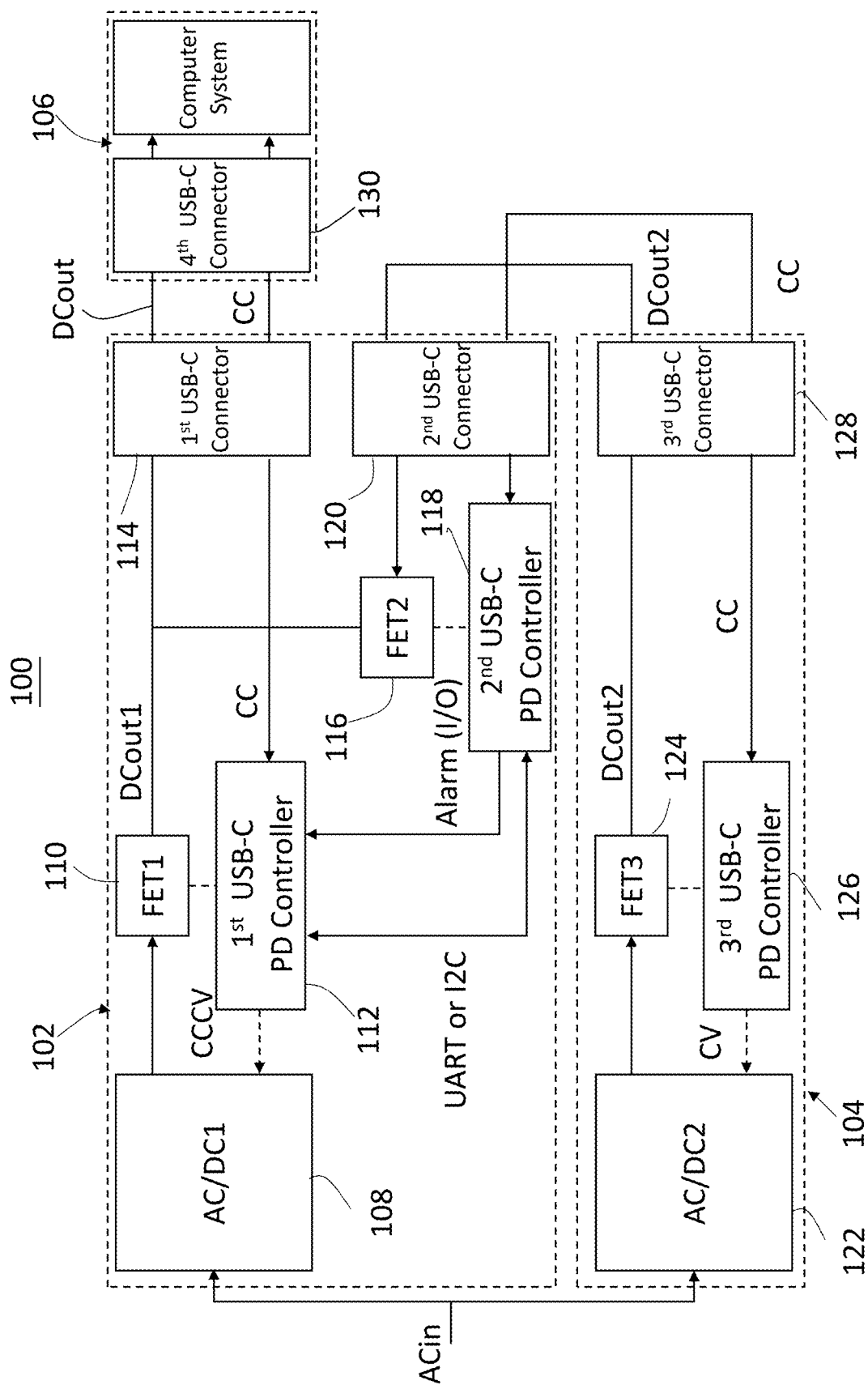
FIG. 2 shows a schematic diagram of a parallel power supply system according to an embodiment of the present invention.

FIG. 2 illustrates a schematic diagram of the parallel power supply system 100 in accordance with an embodiment of the present invention, which includes the first power supply 102 and the second power supply 104 connected in parallel. The first power supply 102 includes the first AC to DC converter (AC/DC1) 108, the first switching device (FET1) 110, the first USB-C PD controller 112, the first USB-C connector 114, the second switching device (FET2) 116, the second USB-C PD controller 118, and the second USB-C connector 120. The second power supply 104 includes the second AC to DC converter 122, the third switching device (FET3) 124, the third USB-C PD controller 126 and the third USB-C connector 128.

The computer system 106 further includes the fourth USB-C connector 130 used to electrically and communicatively connected to the first power supply 102 through the first USB-C connector 114. The parallel power supply system 100 has an AC input voltage (ACin) that is inputted from an AC power source to provide a system power to both the first power supply 102 and the second power supply 104. The first AC to DC converter 108 converts the AC input voltage to the first DC output voltage (DCout1) to be supplied to the computer system 106 through the first USB-C connector 120 and the fourth USB-C connector 130. In some embodiments, the first AC to DC converter 108 can be, e.g., without limitation, a flyback converter, and provides power directly to the first USB-C connector 114. The first switching device 110, for example a field effect transistor (FET1), disposed between the first AC to DC converter 108 and the first USB-C connector 114 may be toggled on or off to provide power, i.e. DCout1, to the first USB-C connector 114. The ON or OFF state of the first switching device 110 is controlled by the first USB-C PD controller 112 upon the request message sent by the computer system 106 through the configuration channel (CC) of the USB-C connector 114. In some embodiments, the request message sent by the computer system 106 can be a vender-defined message (VDM) that obeys USB PD protocol. The computer system 106 can request information about available voltage and current through the USB PD protocol. The first USB-C PD controller 112 can adjust the first AC to DC converter 108 based on the reported available voltage and current to provide a constant voltage (CV) mode power delivery to the computer system 106 through the first switching device 110.

When the second power supply 104 is connected in parallel to the first power supply 102, the second USB-C PD controller 118 learns through the USB PD protocol and notifies the third USB-C PD controller 126 to provide the information of available voltage and current of the second power supply 104. The second USB-C PD controller 118, configured to communicatively coupled between the first USB-C PD controller 112 and the second USB-C connector 120, sets the charging specification according to the information provided by the third USB-C PD controller 126.

The second AC to DC converter 122 converts the AC input voltage to the second DC output voltage (DCout2) to be supplied to the first power supply 102 through connecting the third USB-C connector 128 and the second USB-C connector 120. In some embodiments, the second AC to DC converter 122 can be, e.g., without limitation, a flyback converter, and provides power directly to the third USB-C connector 128. The third switching device 124, for example a field effect transistor (FET3), disposed between the second AC to DC converter 122 and the third USB-C connector 128 may be toggled on or off to provide power to the third USB-C connector 128. The ON or OFF state of the third switching device is controlled by the third USB-C PD controller 126. The third USB-C PD controller 126 sets the second AC to DC converter 122 to output DC power (DCout2) at the constant voltage (CV) mode to the first power supply 102 through the third switching device 124. The output DC power (DCout2) of the second power supply 104 is fed to the first power supply 102 through connecting the third USB-C connector 128 with the second USB-C connector 120.

The present invention utilizes the USB power delivery (PD) communication protocol, i.e. the vender-defined messages (VDM), between the parallel power supply system 100 and the external coupled electronic system (for example computer system 106) to implement specific control and power management of the parallel power supply system 100 for delivering power to the computer system 106. Please refer to FIGS. 1-3 together and the following descriptions for detailing the operating principle.

Figure 3:
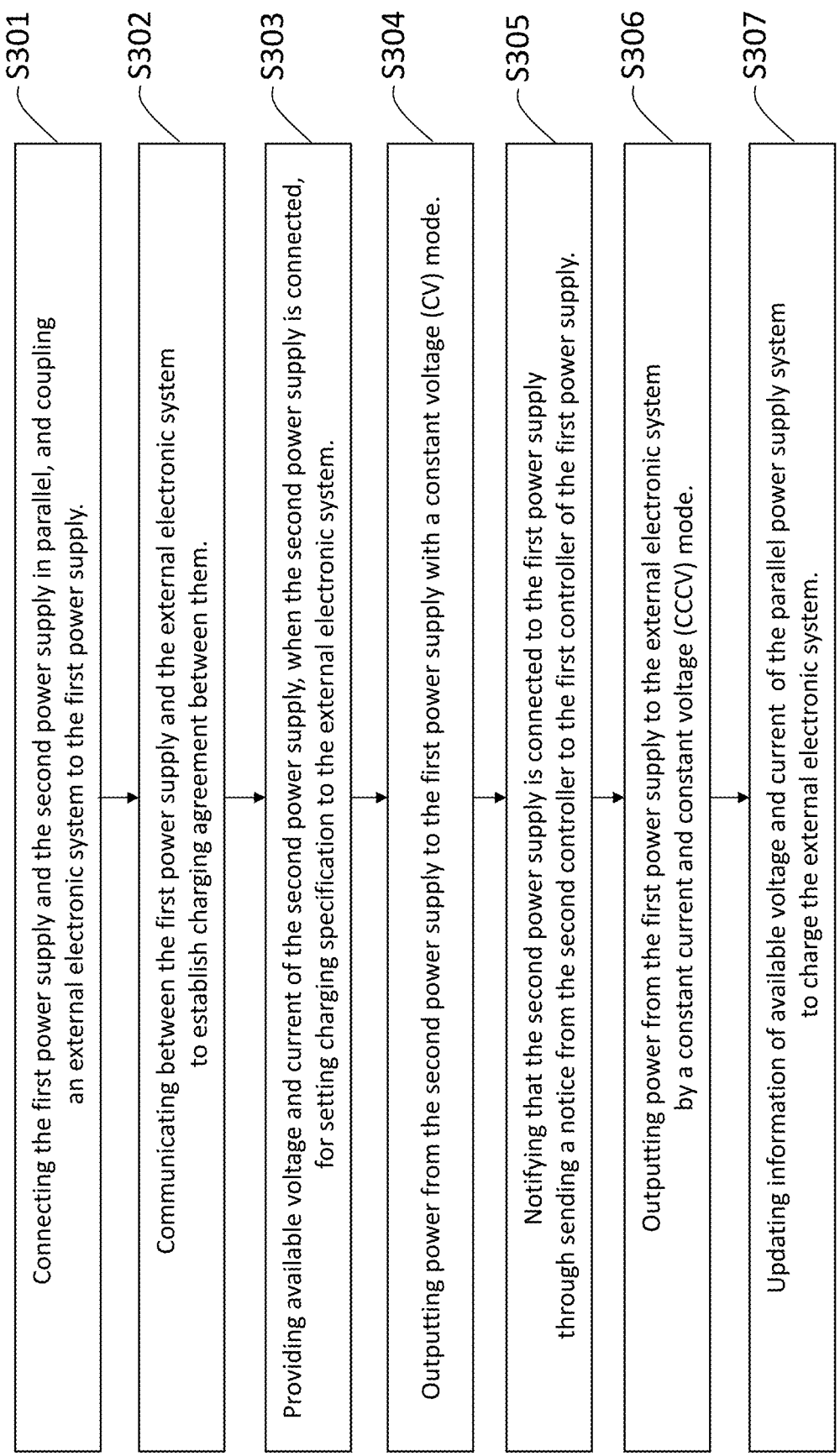
FIG. 3 shows a flow chart method of power sharing from a parallel power supply system to an external electronic system according to an embodiment of the present invention.

FIG. 3 is a follow chart of an exemplary method of power sharing from the parallel power supply system 100 to the external electronic system, such as the computer system 106, in accordance with an embodiment of the present invention. Specifically, the following steps are performed to realize the concept of power sharing (or allocating) of the parallel power supply system 100 (FIGS. 1-2) disclosed by the present invention.

In step S301, a step of connecting the first power supply 102 the second power supply 104 in parallel, and coupling an external electronic system (computer system 106) to the first power supply 102 is performed. The first power supply 102 and the second power supply 104 are connected with an AC power to input the AC power (ACin). The DC output (DCout) of the first power supply 102 is connected to the computer system 106, and the DC output (Dcout2) of the second power supply 104 is connected to the first power supply 102 via the second USB-C connector 120.

In step S302, a step of communicating between the first power supply 102 and the external electronic system (for example the computer system 106) to establish charging agreement between them is performed. In this step, the computer system 106 requests available voltage and current information of the first power supply 102 from the first USB-C PD controller 112 through the USB PD protocol. Here, the first power supply 102 and the computer system 106 can communicate with each other through the configuration channel (CC). In some embodiments, the charging agreement is confirmed through a communication between the first USB-C PD controller 112, i.e. the first USB-C PD controller and a USB-C connector 130 of the external electronic system (computer system 106) by sending the vender defined message (VDM) built in the first USB-C PD controller 112. After the first USB-C PD controller 112 reports the available voltage and current to the computer system 106, the computer system 106 specifies the required charging specifications. Then, the first USB-C PD controller 112 adjusts the first AC to DC converter (AC/DC1) 108 to provide a constant voltage (CV) output and supplies power through the first switch (FET1) to ensure that the computer system receives the constant voltage (CV) power delivery from the first power supply.

In step S303, a step of providing available voltage and current of the second power supply 104 is performed, when the second power supply 104 is connected, for setting charging specification to the external electronic system, for example the computer system 106. In this step, the second USB-C PD controller 118 learns through the USB PD protocol and notifies the third USB-C PD controller 126 to provide the information of available voltage and current of the second power supply 104. Then, the second USB-C PD controller 118 sets the charging specifications based on the data provided by the third USB-C PD controller 126.

In step S304, a step of outputting power from the second power supply 104 to the first power supply is performed. In this step, the third USB-C PD controller 126 sets the second AC to DC converter (AC/DC2) 122 to output power in the constant voltage (CV) mode from the second power supply 104 to the first power supply 102 through controlling the third switch (FET3) in its ON state.

In step S305, a step of notifying that the second power supply 104 is connected to the first power supply 102 through sending a notice from the second USB-C PD controller 118 to the first USB-C PD controller 112 is performed. In this step, the second USB-C PD controller 118 feedbacks to the first USB-C PD controller 112 through alarm (I/O) to notify that the second power supply 104 is connected to the first power supply.

In step S306, a step of outputting power from the first power supply 102 to the external electronic system, such as the computer system 106, by the constant current and constant voltage mode (CCCV) is performed. In this step, the first USB-C PD controller 112 reads the information of power delivery parameter of the second power supply 104 from the second USB-C PD controller 118 through UART communication. The first USB-C PD controller 112 comprehensively considers the power delivery parameters of these two power supplies, i.e. the first power supply 102 and the second power supply 104, and re-declares the overall power delivery capabilities. Then, the first USB-C PD controller 112 controls the first switch (FET1) to provide power to the external electronic system (computer system 106), and the first USB-C PD controller 112 sets the first AC to DC converter (AC/DC1) 108 to charge the external electronic system (computer system) with the constant voltage and fixed current (CCCV) mode.

In step S307, a step of updating information of available voltage and current of the parallel power supply system 100 is performed. In this step, the external electronic system (computer system 106) asks the first USB-C PD controller 112 again for the updating available voltage and current information through the USB PD protocol, and the first USB-C PD controller 112 provides the latest voltage and current information. Based on the updating power delivery capability, the first USB-C PD controller 112 turns on the first switching device (FET1) 110 and instructs the second USB-C PD controller 118 to turn on the second switch (FET2) 116 for passing the power from the second power supply 104, thereby increasing the overall capability of output current.

Through the aforementioned steps, the present invention achieves effective coordination of the parallel power supply system 100, improves the flexibility and efficiency of power delivery, and ensures stable power delivery for the computer system 106.

In summary, the present invention provides an innovative control method for the parallel power supply system (dual power supply system) 100, especially for the application of power management and control using the USB PD communication protocol. Compared to conventional technique, there are following key differentials. (1). Dual power supply coordinative control: This technology achieves effective distribution and utilization of energy by accurately controlling the two power supplies (102 and 104), which is rare in conventional power management systems. (2). Dynamic power switching and adjustment: This technology uses the USB PD protocol to dynamically adjust the power output, automatically switching power source or adjusting power output specifications through constant current and constant voltage (CCCV) mode according to load requirements. Conventional technologies are less flexible in this regard. (3). Intelligent communication coordination: Through USB PD protocol and UART communication, this technology establishes an intelligent communication bridge between two power supplies (102 and 104), allowing them to share and adjust power according to actual power delivery and load conditions. This kind of intelligent coordination mechanism is not common in existing technologies. (4). Energy transfer: This technology realizes high-efficiency energy transfer from the second power supply 104 to the first power supply 102 through advanced control, and ensures that the power output to the computer system 106 meets the demand and is stable. This efficient energy transfer and allocation method improves the energy efficiency and reliability of the parallel power supply system 100. (5). Improvement of the flexibility and adaptability of the system: This technology not only improves the efficiency and stability of the parallel power supply system 100, but also increases the flexibility and adaptability of the system design due to its unique control mechanism, allowing it to better meet the needs of modern electronics.

Figure 4:
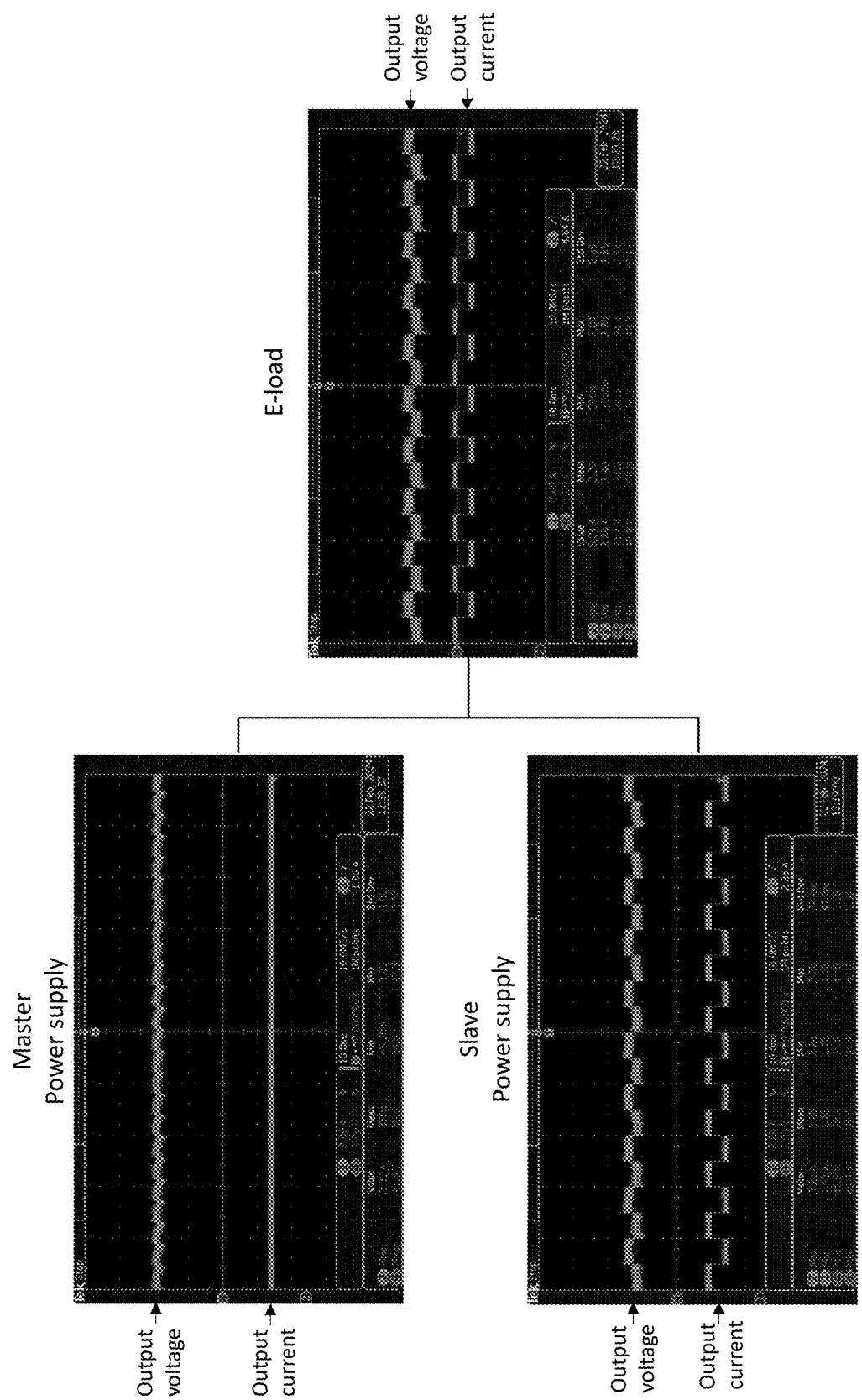
FIG. 4 shows an example that demonstrating test results of two power supplies connected in parallel for sharing 2×84 Watts to a unified load output.

FIG. 4 illustrates an example that shows test results of two power supplies connected in parallel for sharing 2×84 Watts to a unified load output. In FIG. 4, the two power supplies connected in parallel includes a master power supply and a slave power supply, each of which can be used to share 84 Watts to a unified load output (E-load). The master power supply outputs 42 volts and 2 A, while the slave power supply outputs 41.25 volts and current ranging from 2 A to 3 A. Despite that the output voltage of the master power supply is different from that of the slave power supply, the parallel power supply system with the master power supply and the slave power supply can still coordinate to output 41.25 volts and current ranging from 4 A to 5 A over the unified load output. The example shown in FIG. 4 has demonstrated that the flexibility of this technology allows the power supplies with different performance to be connected in parallel, thus greatly improving the convenience of system expansion.

The present invention can gain the following advantages. Firstly, there is no needs to strictly maintain output voltage consistency between parallel power supplies and to precisely control load distribution, which greatly reduces the complexity of system design. At the same time, this also simplifies the selection and matching processes of power supplies, because even power supplies with different power ratings can be used in paralleled connection, easily achieving power expansion and providing larger output power. Secondly, the need for high-precision control systems and adjustment mechanisms can be reduced the need for high-precision control systems and adjustment mechanisms, thereby reducing overall system costs. In addition, maintenance costs are reduced due to the simplification of the system design, as the operation and maintenance of the system become easier. Thirdly, this technology can effectively avoid unnecessary current flow between power supplies due to voltage mismatch, which is very beneficial to improving the overall reliability and stability of the system. The system can operate more stably even in a case that certain power supply experiences performance fluctuations or failures. Fourthly, the flexibility of this technology allows power supplies with different performance to be connected in parallel, thus greatly improving the convenience of system expansion. This means that users, based on the demand, can add or replace power supplies at any time without going through a complex system reconstruction process. For example, the users only need to carry a single power source while going out to reduce the burden, and the users can easily connect another power source in parallel to increase the charging speed when the users return home. This design not only improves the convenience for using the system, but also enhances its adaptability and flexibility. Fifthly, even without forced load sharing, this technology can achieve effective utilization of energy through intelligent management and optimize the overall energy consumption of the system. Sixthly, the flexibility and simplicity of this technology make it suitable for a variety of applications, including but not limited to power systems, data centers, renewable energy systems, etc., especially in scenarios that have high requirements on cost and reliability.

While various embodiments of the present invention have been described above, it should be understood that they have been presented by a way of example and not limitation. Numerous modifications and variations within the scope of the invention are possible. The present invention should only be defined in accordance with the following claims.

What is claimed is:

1. A parallel multi-source power supply system with a unified output, comprising:
a first power supply including a first USB-C connector and a second USB-C connector;
a second power supply including a third USB-C connector electrically connected to said first power supply in parallel through said second USB-C connector;
wherein said first power supply is configured to operate in a constant current and constant voltage (CCCV) mode to output a first power, while said second power supply is configured to operate in a constant voltage (CV) mode to output a second power;
wherein said second power of said second power supply is transferred to said first power supply and unified with said first power to power an external electronic system with a fourth USB-C through said unified output; and
wherein an amount of said second power transferred to said first power supply is determined by a charging agreement through communicating between said first power supply and said external electronic system.

2. The parallel multi-source power supply system of claim 1, wherein said first power supply includes a first AC to DC converter, a first switching device disposed between said first AC to DC converter and said first USB-C connector, wherein a first USB-C PD controller is configured to control said first switching device to provide said first power to said external electronic system.

3. The parallel multi-source power supply system of claim 2, wherein said first power supply further includes a second switching device disposed between said first USB-C connector and said second USB-C connector, wherein a second USB-C PD controller is coupled to said first USB-C PD controller and said second switching device.

4. The parallel multi-source power supply system of claim 3, wherein said second power supply includes a second AC to DC converter, a third switching device disposed between said second AC to DC converter and said third USB-C connector, wherein a third USB-C PD controller is configured to control said third switching device to provide said second power to said first power supply.

5. The parallel multi-source power supply system of claim 4, wherein said charging agreement is confirmed through a communication between said first USB-C PD controller and said fourth USB-C connector by sending a vender defined message built in said first USB-C PD controller.

6. The parallel multi-source power supply system of claim 4, wherein said second power is transferred through a path starting from said second AC to DC converter, said third switching device, said third USB-C connector, said second USB-C controller, said second switching device, said first USB-C connector and said fourth USB-C connector to said external electronic system.

7. The parallel multi-source power supply system of claim 4, further includes an AC input power electrically to provide a system power to both said first power supply and said second power supply.

8. The parallel multi-source power supply system claim 2, wherein said first switching device is a field effect transistor.

9. The parallel multi-source power supply system of claim 3, wherein said second switching device is a field effect transistor.

10. The parallel multi-source power supply system of claim 4, wherein said third switching device is a field effect transistor.

11. A method of power delivering for a parallel multi-source power supply system, comprising:
connecting a first power supply and a second power supply in parallel, and coupling an external electronic system to said first power supply; wherein said first power supply includes a first USB-C PD controller and a second USB-C PD controller; wherein said second power supply includes a third USB-C PD controller;
communicating between said first power supply and said external electronic system by said first USB-C PD controller through a USB PD protocol to establish a charging agreement there-between;
providing an available voltage and a current of said second power supply by said second USB-C PD controller of said first power supply to learn through said USB PD protocol and notify said third USB-C PD controller of said second power supply, when said second power supply is connected, for setting charging specification to said external electronic system;
outputting a first power from said second power supply to said first power supply with a constant voltage (CV) mode;
notifying that said second power supply is connected to said first power supply through sending a notice from said second controller to said first controller;
outputting a second power from said first power supply to said external electronic system with a constant current and constant voltage (CCCV) mode; and
updating an information of available voltage and current of said parallel multi-source power supply system by said first controller to charge said external electronic system.

12. The method of claim 11, wherein said charging agreement is confirmed through a communication between said first USB-C PD controller and a USB-C connector of said external electronic system by sending a vender defined message built in said first USB-C PD controller.

13. The method of claim 12, wherein said first USB-C PD controller and said USB-C connector of said external electronic system is communicated with each other through a configuration channel (CC).

14. The method of claim 11, wherein said constant current and constant voltage (CCCV) mode is set by said first USB-C PD controller.

15. The method of claim 14, wherein said first USB-C PD controller is configured to set a first AC to DC converter of said first power supply to output said second power from said first power supply with said constant current and constant voltage (CCCV) mode.

16. The method of claim 11, wherein said constant voltage (CV) mode is set by said third USB-C PD controller.

17. The method of claim 16, wherein said third USB-C PD controller is configured to set a second AC to DC converter of said second power supply to output said first power from said second power supply with said constant voltage (CV) mode.

* * * * *